(12) United States Patent
Morrison et al.

(10) Patent No.: US 7,874,059 B2
(45) Date of Patent: Jan. 25, 2011

(54) ATTACHMENT FOR CERAMIC MATRIX COMPOSITE COMPONENT

(75) Inventors: Jay A. Morrison, Oviedo, FL (US); Jay E. Lane, Mims, FL (US)

(73) Assignee: Siemens Energy, Inc., Orlando, FL (US)

( * ) Notice: Subject to any disclaimer, the term of this patent is extended or adjusted under 35 U.S.C. 154(b) by 1642 days.

(21) Appl. No.: 11/330,559

(22) Filed: Jan. 12, 2006

(65) Prior Publication Data

US 2010/0263194 A1    Oct. 21, 2010

(51) Int. Cl.
*B23P 11/00* (2006.01)
*F01D 5/14* (2006.01)

(52) U.S. Cl. .................. 29/525.02; 29/525.13; 29/446; 29/889; 416/241 B

(58) Field of Classification Search .............. 29/525.02, 29/525.11, 525.13, 446, 889; 416/229 R, 416/229 A, 241 B
See application file for complete search history.

(56) References Cited

U.S. PATENT DOCUMENTS

| | | | | |
|---|---|---|---|---|
| 3,861,815 | A | * | 1/1975 | Landaeus ................ 403/370 |
| 4,322,192 | A | | 3/1982 | Zavada et al. |
| 4,438,626 | A | | 3/1984 | Berestecki |
| 4,499,646 | A | | 2/1985 | Allor et al. |
| 4,512,699 | A | | 4/1985 | Jackson et al. |
| 4,575,047 | A | | 3/1986 | Boos et al. |
| 4,690,617 | A | | 9/1987 | Oda et al. |
| 4,834,569 | A | | 5/1989 | Foote et al. |
| 4,975,014 | A | | 12/1990 | Rufin et al. |
| 5,211,999 | A | * | 5/1993 | Okada ................... 428/34.5 |
| 5,228,795 | A | | 7/1993 | Gray |
| 5,279,031 | A | * | 1/1994 | Carruthers et al. ......... 29/889.2 |
| 5,306,565 | A | | 4/1994 | Corbin et al. |
| 5,609,434 | A | * | 3/1997 | Yehezkieli et al. ......... 403/260 |
| 5,881,775 | A | | 3/1999 | Owen et al. |
| 6,025,062 | A | | 2/2000 | Krenkel et al. |
| 6,328,513 | B1 | * | 12/2001 | Niwa et al. ................ 411/339 |
| 6,405,425 | B1 | * | 6/2002 | Eriksson .................. 29/525.06 |
| 6,451,416 | B1 | * | 9/2002 | Holowczak et al. ...... 428/293.4 |
| 6,670,021 | B2 | | 12/2003 | Schroder et al. |
| 6,796,765 | B2 | * | 9/2004 | Kosel et al. ................ 415/142 |
| 6,830,437 | B2 | * | 12/2004 | Cairo et al. ............. 416/241 B |
| 7,100,264 | B2 | * | 9/2006 | Skinner et al. ................ 29/523 |
| 7,153,096 | B2 | * | 12/2006 | Thompson et al. .......... 415/200 |
| 7,247,003 | B2 | * | 7/2007 | Burke et al. ............. 416/229 R |
| 7,255,535 | B2 | * | 8/2007 | Albrecht et al. ........... 416/97 R |
| 7,416,362 | B2 | * | 8/2008 | North ......................... 403/30 |
| 7,563,071 | B2 | * | 7/2009 | Campbell et al. ......... 415/173.1 |
| 2007/0107710 | A1 | * | 5/2007 | De Sousa et al. ............ 123/657 |

* cited by examiner

*Primary Examiner*—Essama Omgba

(57) ABSTRACT

A bushing (30, 31) in a hole (26) through a ceramic matrix composite structure (20) with a flange (34, 38) on each end of the bushing (30, 31) extending beyond and around the hole and pressing against opposed surfaces (22,24) of the CMC structure (20) with a preload that resists buckling of the composite structure fibers and resists internal CMC fiber separation. A connecting element (40), such as a bolt or pin, passes through the bushing (30, 31) for engagement with a supporting element (50). The bushing (31) may be formed in place as a single piece of ceramic, and cured along with the CMC structure (20), or it may be formed as two ceramic or metal parts (32, 36) that are joined together and preloaded by threads (33). The connecting element (40) may be a pin, or it may be a bolt with a shaft threaded into one part (32) of the bushing and a head (42) that pushes the second flange (38) toward the first flange (34).

20 Claims, 3 Drawing Sheets

ATTACHMENT FOR CERAMIC MATRIX COMPOSITE COMPONENT

FIELD OF THE INVENTION

This invention relates generally to the field of gas turbine engines, and more particularly to attachment methods and devices for ceramic matrix composite materials in a gas turbine engine.

BACKGROUND OF THE INVENTION

Gas turbine engines operate with internal gas temperatures of over 1400° C. Components in the hot gas path must withstand these temperatures reliably over a long life span. In addition, these components and their connections are subject to wide thermal changes during variations in engine operation, including engine shutdowns and restarts.

A turbine section of a gas turbine engine includes rotating blades and stationary vanes enclosed in a refractory shroud assembled in part from a series of rings of refractory segments. The inner surfaces of these segments must withstand high temperatures. Ceramics are known to be useful in meeting these requirements. However, ceramic components are difficult to attach to metallic components. Ceramic material cannot be welded to metal, and ceramic-metal braze alloys can not withstand the very high temperatures found in gas turbine engines. Ceramic material differs from metal in thermal conductivity and growth, making it challenging to attach ceramic parts to metal parts in a hot and varying environment.

Ceramic matrix composite (CMC) materials typically include layers of refractory fibers in a matrix of ceramic. Fibers provide directional tensile strength and toughness that is otherwise lacking in monolithic ceramic. CMC has durability and longevity in hot environments, and it has lower mass density than competing metals, making it useful for gas turbine engine components. It is often desirable to attach CMC parts to metal via mechanical attachment methods, such as pins and bolts. However, when bores are machined in CMC for bolts or pins the fibers are cut. Stress concentrations in and around a bore from bolt or pin loading, friction, and differential thermal growth all work to degrade the bore and separate the fiber layers. Thus, attaching CMC components to metal structures with bolts or pins is a challenge.

Some CMC shroud ring segments rely on pinned holes for carrying pressure loads. Higher load carry capability is desired for such designs. 2D laminate CMC materials are made from ceramic fibers woven into cloth form. Fiber bundles (tows) in these fabrics have natural out-of-plane undulations that are essentially pre-buckled, and are sites for premature failure under compressive loads. It is known than in-plane compressive strength in CMC is directly related to interlaminar tensile strength by this phenomenon. Current oxide-based CMCs have low interlaminar tensile strength, which limits compressive strength.

Analyses show high local shear and compression stresses in pin-loaded CMC holes. Such stresses are sufficient to cause local damage in the CMC and initiate other modes of failure, such as shear tear-out. Pin-loaded hole tests also show that local damage in the contact zone can result in local delamination and subsequent propagation of damage. Microbuckling may also cause a thickness expansion around the hole.

U.S. Pat. No. 6,670,021 describes a monolithic ceramic bushing for providing a hole in a CMC structure. The bushing is locked within the CMC, so the CMC must be formed around the bushing. The geometry used for locking the bushing in the CMC requires the bushing to undergo the same final processing as the CMC, which makes ceramic the only practical choice for the bushing material.

BRIEF DESCRIPTION OF THE DRAWINGS

The invention is explained in following description in view of the drawings that show.

DETAILED DESCRIPTION OF THE INVENTION

Figure 1:
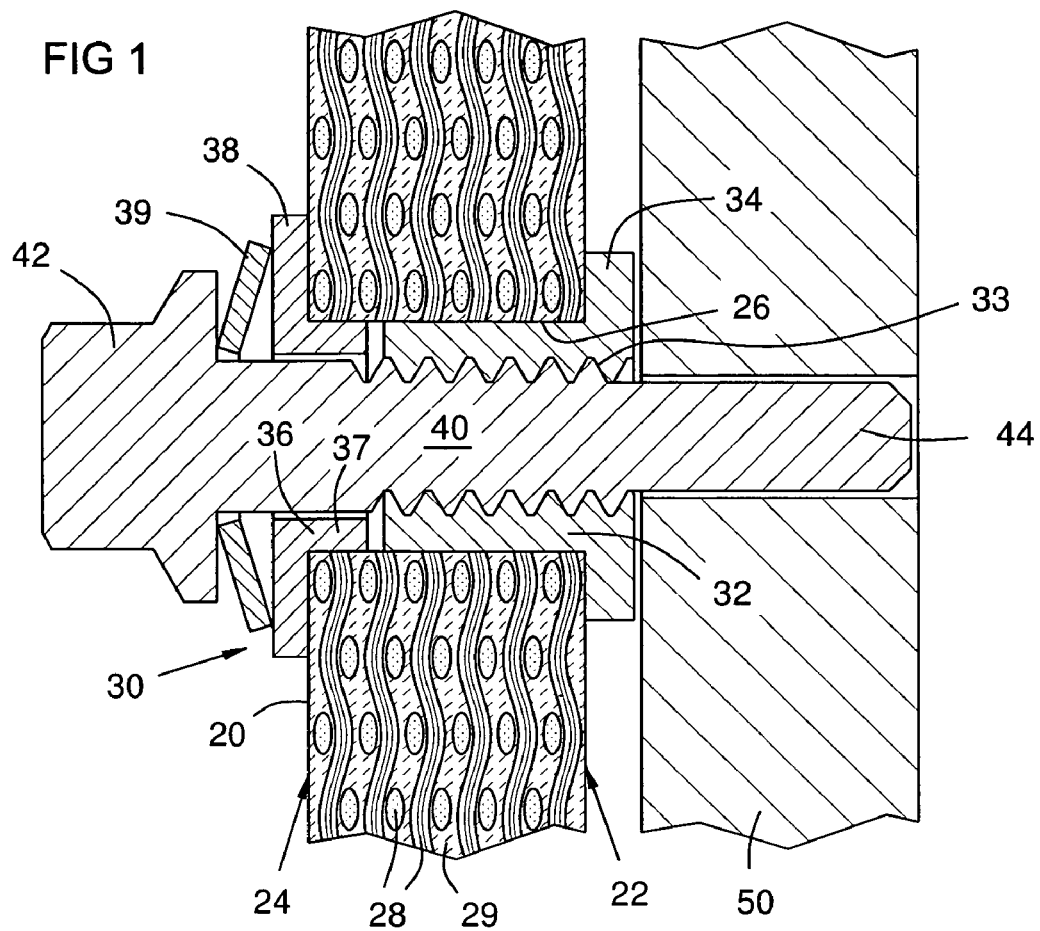
FIG. 1 is a side sectional view of a first aspect of the invention using a two-part bushing, each part comprising a tubular portion and a flange, with a bolt threaded into one of the tubular portions.

FIG. 1 shows a ceramic matrix composite structure 20 with opposed surfaces 22 and 24 and a hole 26 through the structure. Ceramic fibers 28 are disposed between the surfaces 22, 24 and are oriented in substantial alignment with the surfaces. The fibers may be arranged in multiple woven layers of ceramic fabric as shown, or they may be layered in one or more directions without weaving. The fibers 28 are embedded in a ceramic matrix 29. A metal bushing 30 in the hole 26 comprises a first part 32 with a first flange 34 extending beyond and around the hole 26 against one of the surfaces 22, and a second part 36 with a second flange 38 extending beyond and around the hole 26 against the second surface 24.

Figure 2:
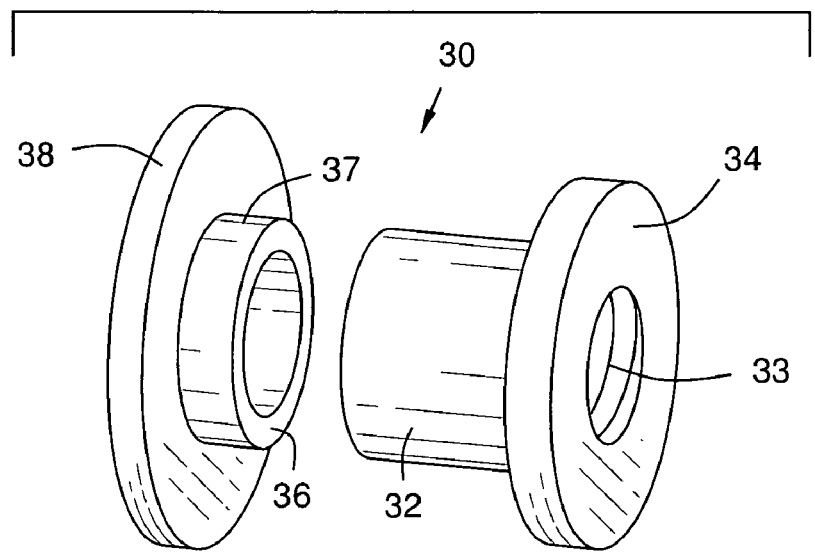
FIG. 2 is a perspective exploded view of the bushing of FIG. 1.

A connecting member 40, such as a pin or bolt, passes through the bushing 30. In FIGS. 1 and 2 the first part 32 of the bushing 30 has internal threads 33, and acts as a nut for a bolt 40 that draws the first and second parts 32, 36 of the bushing 30 toward each other, compressing the CMC structure 20 between them. The bushing 30 functions to provide a compressive pre-load across the thickness of the CMC structure 20 in the region surrounding the hole 26, thereby providing increased resistance against buckling of the fibers 28 under in-plane compressive loading conditions. For the case of a porous matrix CMC formed as a 2D fabric laminate, individual stress components can exceed their normal unidirectional stress limits under certain biaxial or multi-axial stress states. Such is the case for in-plane compression and interlaminar shear when combined with a through-thickness compressive stress. Thus, the present invention adds a through-thickness stress component to enhance the load-carrying capability of the CMC material in other critical load directions.

A spring member such as a Belleville washer 39 may be provided between the bolt head 42 and the second flange 38 to provide a constant preload of the flanges 34, 38 against the CMC surfaces 22, 24 over a wide range of temperatures. The spring member helps accommodate for differences in thermal expansion of the CMC and metal parts. The second part 36 of the bushing may have a tubular portion 37 extending into the hole 26 to center the second flange 38 and the bolt 40 with respect to the hole 26. Otherwise, the second flange may be in the form of a flat washer 43 as shown in FIG. 3, with minimal clearance around the bolt 40 for centering about the bolt.

Figure 3:
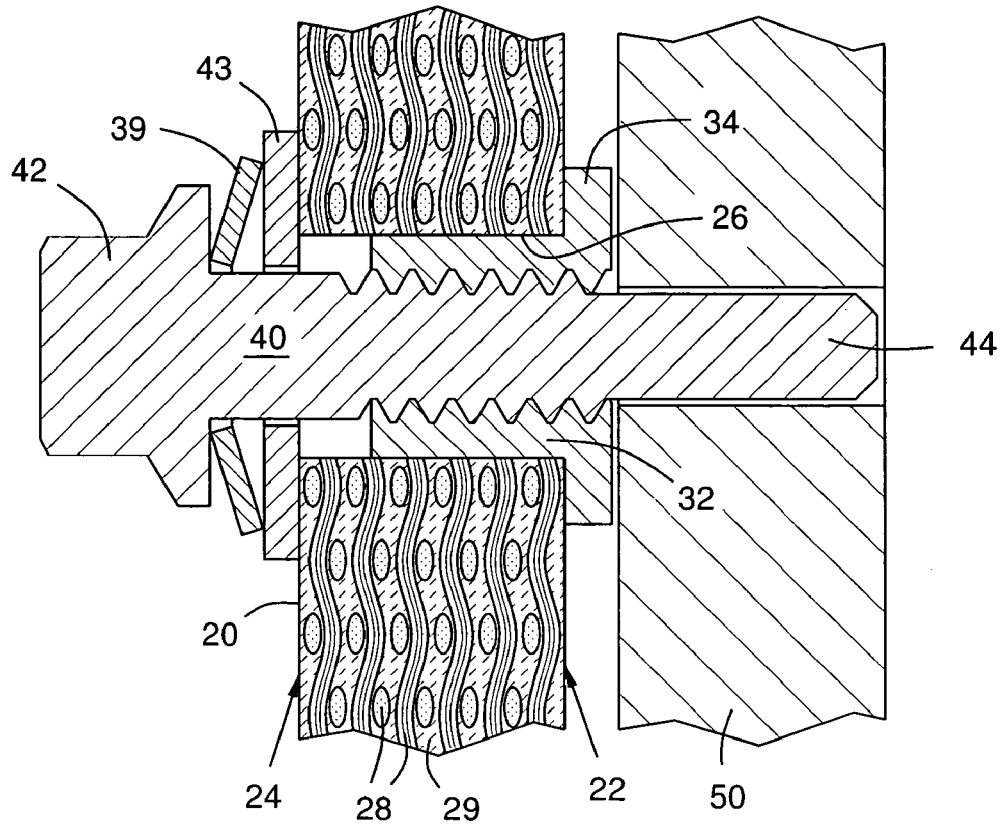
FIG. 3 is a side sectional view of a second aspect of the invention using a two-part bushing with one tubular portion, and a bolt threaded into the tubular portion.

The bolt of FIGS. 1-3 may have a smooth pin 44 extending beyond the threads opposite the head 42 for a pin engagement with a support structure 50 as shown. Such a pin engagement may accommodate for tolerances, wear, and thermal expansion, and reduce stress between parts.

Figure 4:
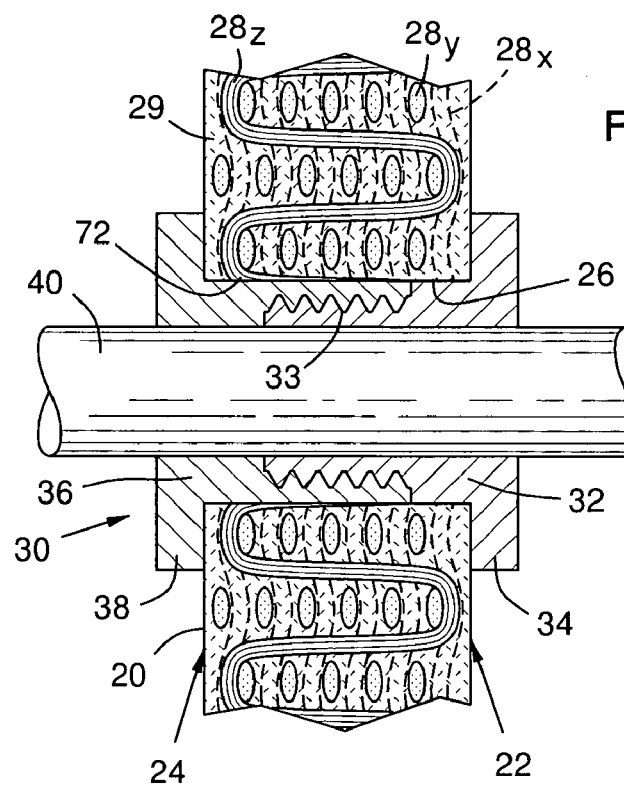
FIG. 4 is a side sectional view of a third aspect of the invention using a two-part bushing with mating threaded tubular portions.

FIG. 4 shows an aspect of the invention in which the bushing 30 has first and second parts 32, 36 that are threaded together in the hole 26 with a given torque to preload the flanges 34 and 38 against the CMC surfaces 22, 24. For example, the first part 32 may have external threads, and the second part 34 may have internal threads, as shown. The parts may be formed of ceramic or of a metal alloy with low thermal expansion, such as Invar® alloy which is an alloy of iron (Fe) and nickel (Ni) and other trace elements. One available version of Invar® is an alloy of nickel (Ni) 36.0%, chromium (Cr) 0.25%, manganese (Mn) 0.50%, silicon (Si) 0.25%, carbon (C) 0.05%, phosphorus (P) 0.020%, sulfur (S) 0.020%, cobalt (Co) 0.50%, and iron (Fe) balance. This alloy has thermal expansion characteristics closer to those of CMC than do some alternate metals, so a consistent preload is maintained. Such an alloy may also be used for the connecting member 40.

Figure 5:
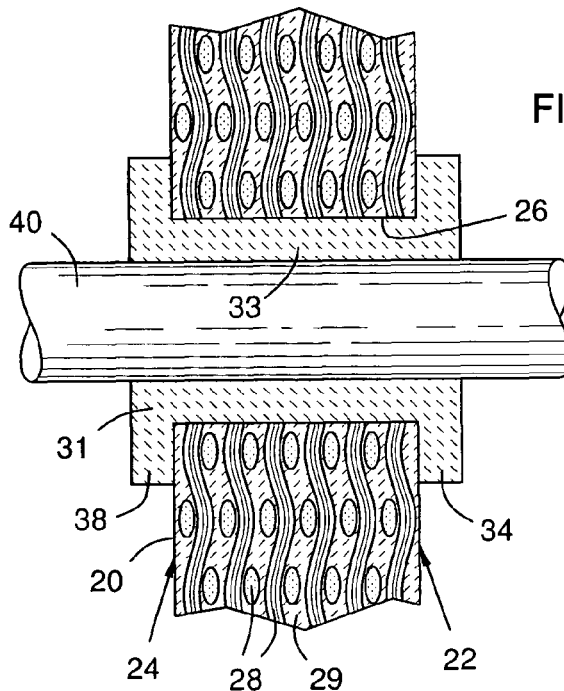
FIG. 5 is a side sectional view of a fourth aspect of the invention using a one-part ceramic bushing that is formed in place in the CMC hole.

FIG. 5 shows an aspect of the invention in which the bushing 31 is a single part with a flange 34, 38 on each end. This bushing may be formed in place in the hole 26 of a ceramic material and fired along with the CMC structure 20. Such a bushing can be made of a structural ceramic material like silicon nitride, silicone carbide, alumina, zirconia, yttria aluminum garnet, or mullite. Forming methods may include slip casting, injection molding, or hot pressing and machining. Advantages of this type of bushing include: 1) a close match of the coefficient thermal expansion of the bushing with that of the CMC, which avoids loosening or tightening of the flange preload due to thermal growth differences; 2) the bushing can bond to the CMC for improved load transfer and reduced wear; 3) the bushing can be co-processed with CMC at high temperatures; 4) the bushing has excellent wear resistance; and 5) the bushing withstands high working temperatures. A preload is applied to the CMC structure 20 by the flanges 34, 38. This preload may be the result of purposeful differential thermal expansion between the bushing 31 and the CMC structure 20 and thereby may vary with temperature from close to or no preload at room temperatures to a desired higher level of preload at an operating temperature. Alternatively, purposeful differential sintering shrinkage during the co-processing of the joined parts may be used to apply the preload.

An industrial application for this attachment method occurs especially in assembly of ring segments in a turbine shroud. The inner surfaces of these segments must withstand high temperatures, and may be made of CMC. The outer portions of these segments may be attached to a surrounding metal support structure via pinned holes. The present invention provides durable means to attach a ring segment to a surrounding support structure by means of CMC structures on outer portions of ring segments. Other applications for CMC assemblies may also benefit from this invention.

Figure 6:
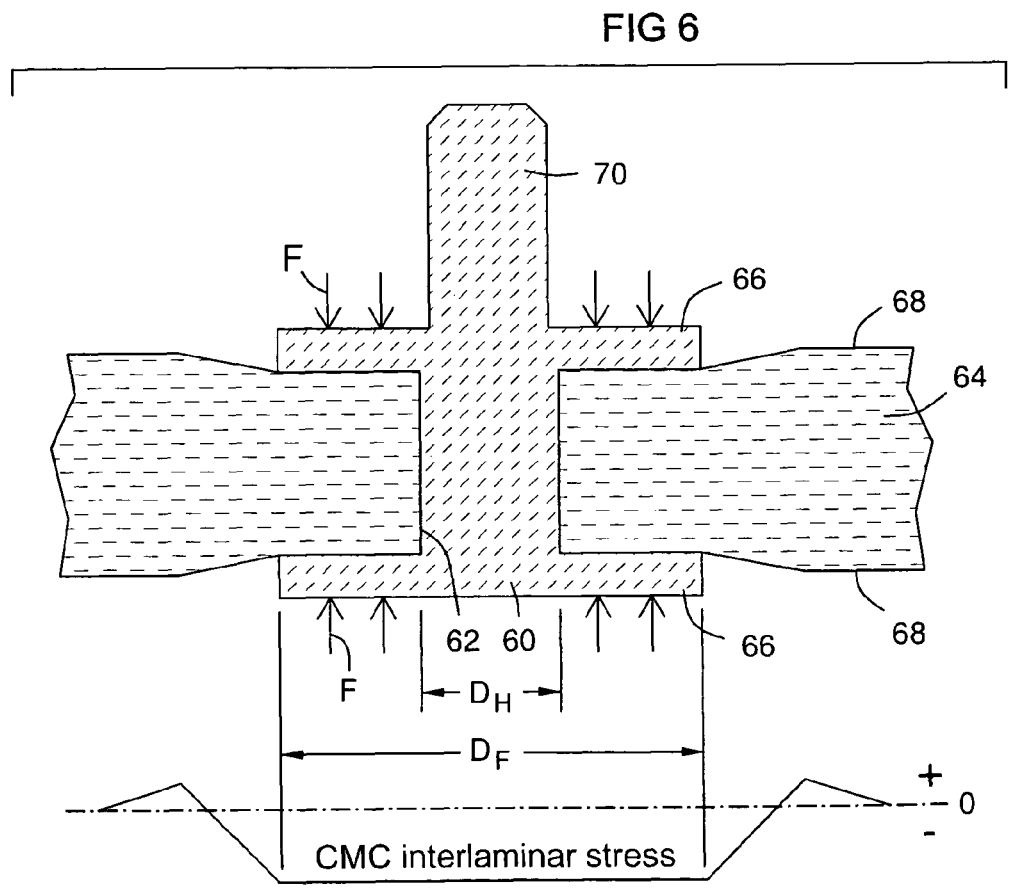
FIG. 6 is a schematic illustration of aspects of the present invention.

FIG. 6 is a schematic illustration of a bushing 60 disposed in a hole 62 formed in a CMC member 64. The hole has a diameter of $D_H$ and the bushing 60 includes opposed flanges 66 having respective diameters of $D_F$. The bushing exerts a compressive force F against the opposed outermost surfaces 68 of the CMC member 64 which serves to suppress the micro-buckling mode of failure of the fibers within the CMC member 64 when subjected to pin loading imposed by the shank portion 70 of the bushing. Compression of the thru-thickness dimension of the CMC member 64 is exaggerated in this drawing for illustration purposes only. In one embodiment the diameter $D_F$ of the bushing flanges 66 is at least 1.5 times the diameter $D_H$ of the hole 62, or in the range of 1.5-2.5 times the diameter $D_H$ of the hole 62 in order to achieve adequate suppression of micro-buckling proximate the hole 62.

The level of force F applied by the bushing 60 may be greater than or equal to zero at ambient conditions, and preferably greater than zero during pin loading of the bushing 60. The level of force F must also be less than a value that would generate interlaminar compressive stresses in the CMC member 64 that would exceed the allowable $\sigma_{IL}^{COMP}$ value for the particular material. FIG. 6 also illustrates the level of interlaminar stress developed within the CMC member 64 as a result of preload force F. Note that while force F generates compressive interlaminar stress directly under the flanges 66, there is a region beyond the flanges 66 wherein the resulting interlaminar stress is tensile. This region of tension must also be considered when selecting the amount of preload force F, since a typical CMC material may have an interlaminar tensile strength that is only a fraction of its interlaminar compressive strength. The present inventors expect that tensile failure in this region may be conservatively avoided by limiting the interlaminar compressive preload stress $\sigma_{IL}^{PRELOAD}$ to less than five times the interlaminar tensile strength or to less than two times the interlaminar tensile strength (<5 $\sigma_{IL}^{TENS}$ or <2 $\sigma_{IL}^{TENS}$).

FIGS. 1, 3 and 5 are illustrated with 2D fiber-reinforced CMC material. FIG. 4 illustrates the application of the present invention to 3D fiber-reinforced CMC material. In addition to in-plane ceramic fibers $28_X$, $28_Y$ that are oriented in substantial alignment with the surfaces 22, 24, a 3D fiber-reinforced CMC material also includes ceramic 3D reinforcing fibers $28_Z$ weaved among the in-plane fibers $28_X$, $28_Y$ and generally oriented in a through-thickness direction for providing improved interlaminar strength to the material. The through-thickness fiber $28_Z$ is typically continuous across a region of the material. However, when a hole 26 is formed in the CMC material, the hole interrupts the 3D reinforcing fiber $28_Z$ to define fiber ends 72 that reduce the interlaminar strengthening effect of the through-thickness fiber $28_Z$. The flanges 34, 38 of the bushing 30 extend over and compressively bracket the fiber ends 72 to secure the fiber end 72 relative to the fibers $28_X$, $28_Y$ that are oriented in substantial alignment with the surfaces. Thus, the bushing 30 of the present invention overcomes the effect of the cut through-thickness fiber $28_Z$ and it functions to provide a degree of interlaminar strength in the CMC material proximate the hole 26 that at least equals the interlaminar strength of the material remote from the hole 26.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. An attaching method comprising:
   forming a ceramic matrix composite structure comprising first and second opposed surfaces and ceramic fibers disposed between the surfaces and oriented in substantial alignment with the surfaces and with a hole extending through the ceramic matrix composite structure;
   disposing a bushing in the hole, the bushing comprising a first end with a first flange extending radially beyond the hole against the first surface and a second end with a second flange extending radially beyond the hole against the second surface; and compressively bracketing the fibers of the ceramic matrix composite structure proximate the hole between the first and second flanges with a preload interlaminar compressive stress of less than five times the interlaminar tensile strength of the ceramic matrix composite structure ($<5\sigma_{IL}^{TENS}$).

2. The attaching method of claim 1, wherein the disposing step comprises forming the bushing in place in the hole as a single piece of a refractory material, and further comprising curing the bushing in place.

3. The attaching method of claim 1, wherein prior to the disposing step the bushing is formed as first and second parts, with the first and second flanges formed on the respective first and second parts.

4. The attaching method of claim 3, wherein first and second parts of the bushing each comprise a tubular portion for centering the respective part in the hole.

5. The attaching method of claim 4, wherein the first and second parts of the bushing are formed with mating threads on the respective tubular portions, and the disposing step comprises threading the respective tubular portions together within the hole.

6. The attaching method of claim 3, wherein the first part of the bushing comprises a tubular portion with internal threads, and the second part comprises a bolt comprising a head and a shaft with external threads, and the disposing step comprises threading the bolt into the first part of the bushing with the bolt head compressing the second flange against the second surface of the ceramic composite matrix structure.

7. The attaching method of claim 6, wherein the bolt further comprises a pin extending beyond the shaft threads opposite the head for engagement with a corresponding pin hole in an adjacent structure.

8. The attaching method of claim 6, further comprising a spring member disposed between the bolt head and the second flange.

9. The attaching method of claim 1, further comprising forming the first and second flanges to comprise a diameter of 1.5-2.5 times a diameter of the hole.

10. The attaching method of claim 1, further comprising compressively bracketing the fibers of the ceramic matrix composite structure proximate the hole between the first and second flanges with a preload interlaminar compressive stress of less than two times the interlaminar tensile strength of the ceramic matrix composite structure ($<2\sigma_{IL}^{TENS}$).

11. An attaching method comprising:
forming a ceramic matrix composite structure comprising first and second opposed surfaces and ceramic fibers disposed between the surfaces and oriented in substantial alignment with the surfaces and with a hole extending through the ceramic matrix composite structure;
disposing a bushing in the hole, the bushing comprising a first end with a first flange extending radially beyond the hole against the first surface and a second end with a second flange extending radially beyond the hole against the second surface;

compressively bracketing the fibers of the ceramic matrix composite structure proximate the hole between the first and second flanges; and forming the ceramic matrix composite structure to additionally comprise a ceramic 3D reinforcing fiber weaved among the ceramic fibers oriented in substantial alignment with the surfaces, the hole interrupting the 3D reinforcing fiber to define a fiber end;

wherein the 3D reinforcing fiber end is compressively bracketed between the first flange and the second flange to secure the fiber end relative to the ceramic fibers oriented in substantial alignment with the surfaces.

12. The attaching method of claim 11, wherein the disposing step comprises forming the bushing in place in the hole as a single piece of a refractory material, and further comprising curing the bushing in place.

13. The attaching method of claim 11, wherein prior to the disposing step, the bushing is formed as first and second parts, with the first and second flanges formed on the respective first and second parts.

14. The attaching method of claim 13, wherein first and second parts of the bushing each comprise a tubular portion for centering the respective part in the hole.

15. The attaching method of claim 14, wherein the first and second parts of the bushing are formed with mating threads on the respective tubular portions, and the disposing step comprises threading the respective tubular portions together within the hole.

16. The attaching method of claim 13, wherein the first part of the bushing comprises a tubular portion with internal threads, and the second part comprises a bolt comprising a head and a shaft with external threads, and the disposing step comprises threading the bolt into the first part of the bushing with the bolt head compressing the second flange against the second surface of the ceramic composite matrix structure.

17. The attaching method of claim 16, wherein the bolt further comprises a pin extending beyond the shaft threads opposite the head for engagement with a corresponding pin hole in an adjacent structure.

18. The attaching method of claim 16, further comprising a spring member disposed between the bolt head and the second flange.

19. The attaching method of claim 11, further comprising forming the first and second flanges to comprise a diameter of 1.5-2.5 times a diameter of the hole.

20. The attaching method of claim 11, further comprising compressively bracketing the fibers of the ceramic matrix composite structure proximate the hole between the first and second flanges with a preload interlaminar compressive stress of less than five times the interlaminar tensile strength of the ceramic matrix composite structure ($<5\sigma_{IL}^{TENS}$).

* * * * *